July 31, 1962   O. VON ZELEWSKY   3,046,822
DEVICE FOR CHANGING DUPLICATING TEMPLATES IN DUPLICATING UNITS
Filed Dec. 17, 1959   3 Sheets-Sheet 1

INVENTOR.
Ottomar von Zelewsky
BY
Patent Agent

July 31, 1962 O. VON ZELEWSKY 3,046,822
DEVICE FOR CHANGING DUPLICATING TEMPLATES IN DUPLICATING UNITS
Filed Dec. 17, 1959 3 Sheets-Sheet 2
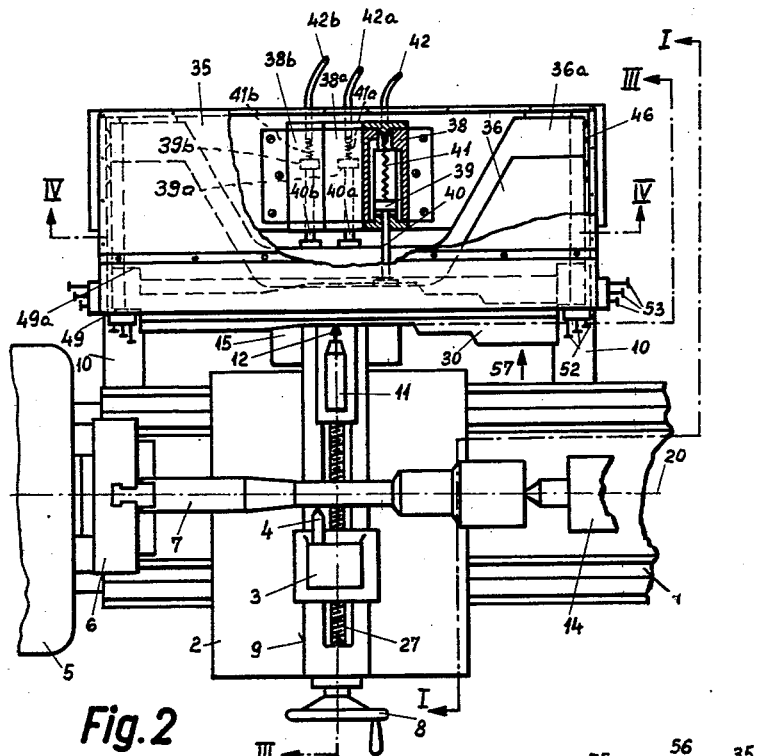
Fig.2
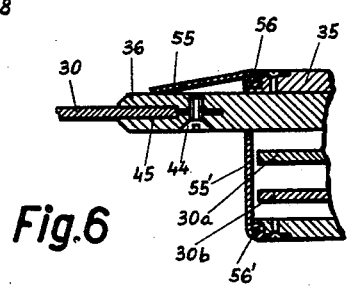
Fig.6
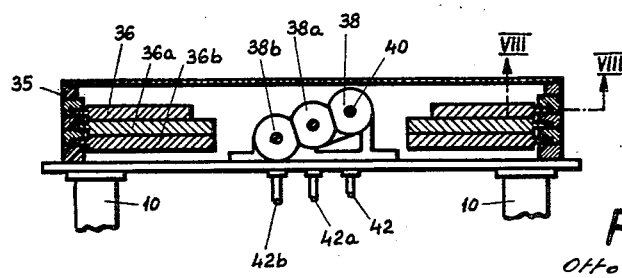
Fig.4
INVENTOR.
Ottomar von Zelewsky
BY
Patent Agent

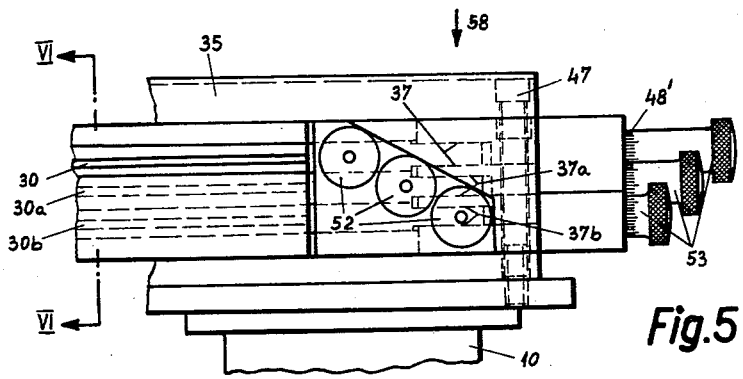
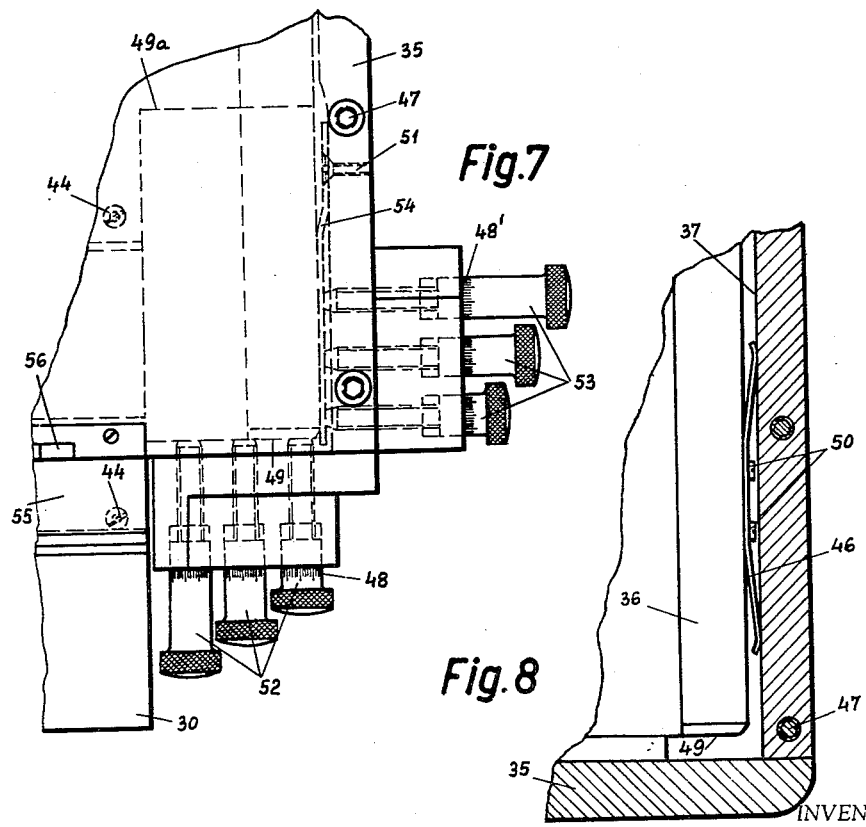

United States Patent Office 3,046,822
Patented July 31, 1962

---

3,046,822
DEVICE FOR CHANGING DUPLICATING
TEMPLATES IN DUPLICATING UNITS
Ottomar von Zelewsky, Nehausen am Rheinfall, Switzerland, assignor to Georg Fischer Aktiengesellschaft, Schaffhausen, Switzerland
Filed Dec. 17, 1959, Ser. No. 860,246
Claims priority, application Switzerland Dec. 20, 1958
4 Claims. (Cl. 82—14)

My invention relates to a device for changing duplicating templates for a duplicating unit, and more particularly to a turning lathe with a duplicating unit.

It is known to use template changers in duplicating machine tools where the duplicating templates to be used in a certain operating cycle are arranged in a swiveling or rotating device so that they can be brought at will into the range of the feeler element scanning them. For controlling and reversing the swiveling devices mechanical, hydraulic, electric or combined elements are utilized.

Known devices which can receive two or more duplicating templates require much space and the templates that are not required in the respective machine operation are subject to soiling. The danger that the template edges to be scanned might be damaged is also great.

The template changer according to my invention eliminates these disadvantages and is characterized in that at least two template carriers, each of which is associated with a duplicating template, are arranged in a template case parallel to each other such that they can be displaced at will in the same direction in operating position.

An embodiment of the subject of my invention is represented in the attached drawings, and is set forth more fully in the specification hereinafter following by reference to the attached drawings, in which:

FIG. 2 shows a partial view from the top of a lathe with a duplicating device with the duplicating template changer shown in partial section;

FIG. 4 is a longitudinal section-view taken substantially along line IV—IV of FIG. 2;

FIG. 5 is a fragmentary elevational view looking in the direction of the arrow 57 in FIG. 2;

FIG. 6 is a fragmentary cross-sectional view taken substantially along the line VI—VI of FIG. 5;

FIG. 7 is a partial view from the top looking in the direction of the arrow 58 in FIG. 5; and FIG. 8 is an enlarged fragmentary sectional view taken substantially along the line VIII—VIII of FIG. 4.

Figure 1:
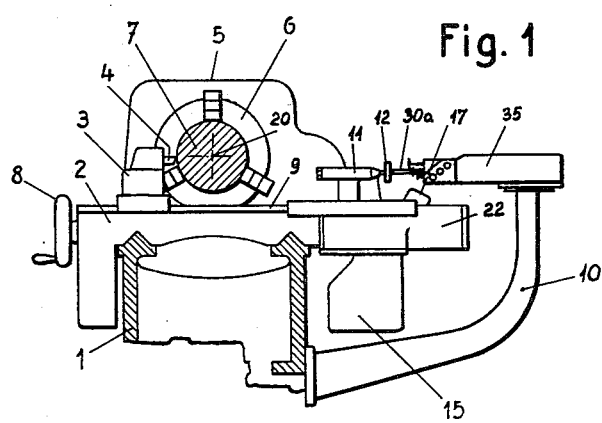
FIG. 1 is a cross-section view taken substantially along the line I—I of FIG. 2 through a lathe with a duplicating device.

Referring to the drawings in greater detail, on the bed 1 of the lathe, represented fragmentarily in FIGS. 1 and 2, is arranged a carriage 2 which can be displaced (by means not shown) parallel to the work axis 20 of the workpiece. FIGS. 1 and 2 show parts of a headstock 5 with a chuck 6, as well as the spindle sleeve 14 of a tailstock (not shown). A workpiece, designated at 7, is clamped in the represented example between the chuck 6 and the spindle sleeve 14. In the represented embodiment a hydraulic duplicating device is attached on the rear side of the carriage 2 to actuate a tool slide 3 carrying a turning tool 4 and sliding on guides 9 of the carriage 2.

Figure 3:
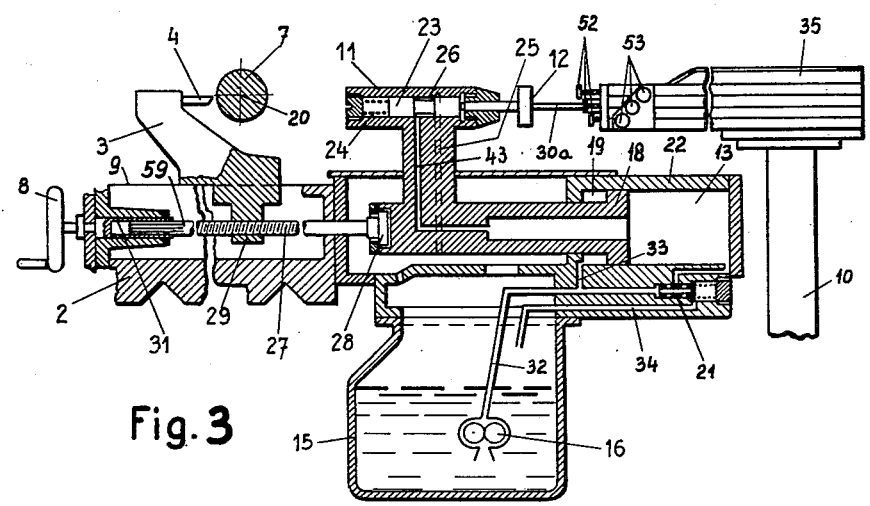
FIG. 3 shows a cross-section view taken substantially along the line III—III of FIG. 2.

The hydraulic duplicating device, which is not the subject of the invention, consists substantially of a pressure tank 15 in which is arranged a pressure pump 16 represented schematically in FIG. 3 and driven by a motor indicated at 17 in FIG. 1. In a working cylinder 22, a working piston 18 is a longitudinally displaceable and provided with a distribution valve housing 11 in which is disposed a distribution slide valve 23, which can be displaced by a compression spring 24 in the direction toward a longitudinally displaceable feeler 12. The latter is secured against turning in the distribution valve housing by means not represented herein. In the distribution valve housing 11 is provided a bore 43 leading into the working piston 18 and a bore 25 leading into the pressure tank 15.

On the left side of the working piston 18 (FIG. 3) a collar 28 of a threaded spindle 27 is so mounted that it can turn but not move axially, its other end being provided with a multiple key shaft profile 59, which can slide in a multiple key hub 31, rigidly connected with a hand wheel 8, and rotatable in the carriage 2. If the tool slide 3 carrying the turning tool 4 is to be displaced by hand traverse to the work axis 20, this is done by turning the hand wheel 8 which turns the threaded spindle 27, which engages a threaded nut on the tool slide 29, thus displacing the tool slide 3 on its slideways 9, without impairing or influencing the hydraulic duplicating unit.

In the working cylinder 22 is also arranged a pressure regulating valve 21 as well as pressure pipes 32 and 33 and a return pipe 34.

On the rear side of the lathe bed 1, as shown in FIGS. 1 and 2, a template case 35 is arranged on two fastening arms 10 in which three duplicating templates 30, 30a and 30b in the represented embodiment can be brought at will, by means to be described later, into the range of action of the duplicating feeler 12.

In the duplicating case 35, whose parts are held together, for example, by means of screws 47, are arranged as shown in FIGS. 2, 5, 6, 7 and 8, three template carriers 36, 36a and 36b in parallel slideways 37, 37a and 37b, which can be displaced in the same direction.

The case 35 also contains three pressure cylinders 38, 38a and 38b, each provided with an operating piston 39, 39a, 39b, and a piston rod 40, 40a, 40b, each of the latter being respectively connected with one of the three template carriers 36, 36a, 36b, as indicated in FIG. 2. In each of the cylinders 38, 38a, 38b is arranged a tension spring 41, 41a, 41b, secured at one end on the latter and at the other end on the respective piston 39, 39a, 39b to pull back the respective piston 39, 39a, 39b with the piston rod 40, 40a, 40b and the template carrier 36, 36a, 36b, respectively, to the pressure-free state of the respective cylinder (FIG. 2). Each of the three pressure cylinders 38, 38a, 38b is connected with a pressure pipe 42, 42a, 42b. All three pressure pipes lead to a control cock (not represented) which permits both the selective feeding of a pressure agent at will to one of the three pressure pipes from a pressure source (not represented), and the selective connection of the pipes with the atmosphere.

At the front of each of the three template carriers 36, 36a, 36b is provided, as shown in FIG. 6, a slit 45 for a duplicating template 30, 30a, and 30b, respectively, in which the latter can be locked by means of screws 44.

On both sides of each of the three template carriers 36, 36a, 36b adjacent the rear edges thereof are secured, by means of screws 50, leaf springs 46 (FIG. 8) which abut on the bottom of the slideways 37, 37a, 37b and which serve to guide the respective template carrier resiliently in its slideways.

For providing fine adjustments within certain limits to each of the three template carriers 36, 36a, 36b carrying a duplicating template each, stop screws 52 provided with scales 48 and adjusting screws 53 provided with scales 48′ are arranged in the case 35.

FIGS. 2, 5 and 7 show that three such stop screws 52 are provided on each end of the face of the case 35 and three adjusting screws 53 extend laterally from each end of said case. As can be seen from FIGS. 4 and 7, leaf springs 54, secured by means of screws 51 to the side of the case, are provided in each of the three slideways 37, 37a and 37b of the template case 35 at the two opposite points where the adjusting screws 53 can be moved against the side edges of the three template carriers 36, 36a, 36b. The adjusting screws 53 permit slight corrections in the position of the template carriers 36, 36a, 36b in axial directions, that is in a plane parallel to the fulcrum 20. The stop screws 52 protrude into the case 35 and serve to correct within certain limits, for example, a conicity formed during the machining of a cylindrical workpiece according to a coarsely adjusted duplicating template, that is, to change the position of the extended duplicating template with regard to the work axis 20; the stop screw 52 associated with the respective template abutting on the corresponding striking edge 49, 49a or 49b (FIGS. 2 and 7) and the associated template carrier 36, 36a or 36b.

At the front of the template case 35 are provided, as shown in FIG. 6, two hinged metal covers 55 and 55′, which are under the action of spring members (not represented) and which turn about the hinge axis 56 and 56′. These metal covers serve as strippers and protective covers during the extension and the retraction procedures, respectively, of the template carriers and of the templates 30, 30a and 30b, respectively. When all the templates are in the retracted position the two metal covers 55 and 55′ are in the closed position.

Instead of the hydraulic duplicating unit represented and described in the embodiment herein, I can also use any other hydraulic, mechanical or electrical duplicating device. The template changer itself could also be arranged on any other duplicating lathe, for example, a vertical lathe with a duplicating unit.

The method of operation of the duplicating template changer of my invention is as follows:

Three different profiles (rough turned and finish-turned contours) are to be duplicated successively on one and the same workpiece 7 by means of the hydraulic duplicating unit, these contours corresponding to the contours on the three duplicating templates 30, 30a and 30b.

In FIG. 3, the duplicating template 30a is shown in the extended or operating position. By means of a control cock (not represented) which controls the pressure agent in the three pressure lines 42, 42a and 42b, as previously described, pressure has been applied in this case on the center pressure cylinder 38a, so that the operating piston 39a carrying piston rod 40a and the template carrier 36a, which carries the duplicating template 30a, is displaced against the action of the tension spring 41a to the left in the direction of the feeler member 12. The feeler member 12 can be shifted to the left and retained by the holding elements (not represented) acting on the distributing slide valve 23, so that the turning tool 4 arranged on the tool slide 3 can be moved from the range of the workpiece 7 and the feeler 12 from the range of the duplicating template.

After the turning lathe has been put in operation, that is, after starting the turning spindle with the chuck 6 carrying the workpiece 7, and the motor 17 for the pressure pump, the holding element for the distributing slide valve 23 (not represented) is released, allowing the slide valve to move to the right, so that the hydraulic duplicating unit operates in the known manner.

The pressure pump 16 delivers the pressure agent continuously to the annular chamber 19 of the working piston 18 through pressure pipes 32 and 33. The pressure therein is kept constant by a pressure regulating valve 21 and the pressure of the pressure agent that flows from the regulating valve 21 into the cylinder chamber 13 is regulated in known manner by the distributing edge 26 of the distributing slide valve 23. The pressure agents, delivered continuously from the pump 16 flow from the cylinder 22 through the return pipe 34, and back into the pressure tank 15, when the working piston has reached its end position.

When the machining operation that has been effected, for example, according to the duplicating template 30a, is completed, and the next template, for example 30b, is to be used, the turning tool 4 is withdrawn from the workpiece 7 and retained in this position.

Then, for example, during the automatic return of the turning carriage 2 from its left-hand into its right-hand end position, that is, the starting position for the following or succeeding step, the pressure pipe 42a is made pressure-free or is opened to the atmosphere by a suitable control element (not represented). The operating piston 39a, together with the associated template carrier 36a and the template 30a is now pulled into its rear position by the action of the tension spring 41a, so that the template disappears in the template case 35. Concurrently, with the above described return motion of template carrier 36a, or at any other time, pressure is applied to the pipe 42b by a control element (not represented) so that the operating piston 39b, overcoming the action of the tension spring 41b, moves outwardly of the cylinder 38b, bringing the template 30b into the operating position.

But it is also possible to provide automatic elements, that is, elements that are influenced by a preset course, to effect the change of the templates.

After the last machining operation has been completed, the template used, for example 30b, can be withdrawn from the operating position, after which the metal cover 55′, for example, closes automatically.

The changing of the duplicating templates 30, 30a and 30b, when resetting the turning lathe can be effected in a simple manner by loosening the countersunk screws 44 in the respective template carriers (FIG. 6). The fine adjustment of the templates locked in the template carriers is effected in the previously described maner.

The template changer according to my invention has the advantage that it requires little space even when several templates are used, since the template holder does not have to perform any swiveling or rotating motions. The arrangement of the templates in a closable case reduces considerably the danger of damaging or soiling the scanning cams of the duplicating templates that are machined within narrow tolerances.

What I claim as new and desire to secure by Letters Patent of the United States is as follows:

1. A duplicating template changer mechanism for a duplicating machine tool comprising, a stationary template case, a multiplicity of template carrier means slidably mounted within said template case in relatively closely spaced parallel relation to each other, each of said template carrier means attachably carrying duplicating template means, means for selectively displacing said multiplicity of template carrier means but only one at a given interval of time from said case in the same direction into operating position, and a feeler member for engagement with said template means spanning the said template means so as to be engaged with any of the template means that is in operating position.

2. A duplicating template changer mechanism as set forth in claim 1 in which first adjustment means and second adjustment means are associated with each template carrier means of said multiplicity of template carrier means adjustable for positioning said template carrier means in two different planes.

3. A duplicating template changer mechanism as set forth in claim 1 in which a plurality of motors is provided in said case and each template carrier means of said multiplicity of template carrier means being connected to an individual one of said motors for selective displacement of said template carrier means from said template case.

4. A duplicating template changer mechanism as set forth in claim 1 in which the side of the case toward said feeler comprises spring-loaded cover means normally closing the case and adapted for being pushed open by movement of any of said template carrier means into operative position.

References Cited in the file of this patent

UNITED STATES PATENTS

| 2,239,413 | Dewey | Jan. 3, 1939 |
| 2,709,854 | Price | Aug. 18, 1954 |

FOREIGN PATENTS

| 866,275 | France | Apr. 21, 1941 |
| 1,016,250 | France | May 20, 1952 |